(12) United States Patent
Fang et al.

(10) Patent No.: US 9,226,243 B2
(45) Date of Patent: Dec. 29, 2015

(54) NETWORK ASSISTED FAST OPEN LOOP POWER CONTROL ADJUSTMENT

(71) Applicants: ZTE (USA) Inc., Morristown, NJ (US); ZTE Corporation, Shenzhen (CN)

(72) Inventors: Yonggang Fang, San Diego, CA (US); YuanFang Yu, Shenzhen (CN); Ting Lu, Beijing (CN); Xiaowu Zhao, Shenzhen (CN)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 254 days.

(21) Appl. No.: 13/858,412

(22) Filed: Apr. 8, 2013

(65) Prior Publication Data

US 2013/0267269 A1    Oct. 10, 2013

(30) Foreign Application Priority Data

Apr. 6, 2012    (WO) ................ PCT/CN2012/073607

(51) Int. Cl.
| | |
|---|---|
| *H04B 7/00* | (2006.01) |
| *H04W 52/10* | (2009.01) |
| *H04W 52/50* | (2009.01) |
| *H04W 52/08* | (2009.01) |
| *H04W 52/32* | (2009.01) |
| *H04W 52/54* | (2009.01) |

(52) U.S. Cl.
CPC ............. *H04W 52/10* (2013.01); *H04W 52/50* (2013.01); *H04W 52/08* (2013.01); *H04W 52/325* (2013.01); *H04W 52/54* (2013.01)

(58) Field of Classification Search
CPC .................................................... H04W 52/10
USPC ................ 455/522, 88, 445, 550.1, 436, 437
See application file for complete search history.

(56) References Cited

U.S. PATENT DOCUMENTS

| | | | |
|---|---|---|---|
| 6,963,755 B2 * | 11/2005 | Chen et al. ................... | 455/522 |
| 7,512,153 B2 * | 3/2009 | Kwon et al. .................. | 370/468 |
| 8,134,957 B2 * | 3/2012 | Kim et al. ..................... | 370/328 |
| 8,605,686 B2 | 12/2013 | Lundby | |
| 2002/0111183 A1 * | 8/2002 | Lundby ......................... | 455/522 |
| 2003/0093364 A1 * | 5/2003 | Bae et al. ........................ | 705/37 |
| 2003/0124988 A1 * | 7/2003 | Bae et al. ........................ | 455/88 |
| 2006/0009250 A1 | 1/2006 | Lee et al. | |
| 2009/0011786 A1 * | 1/2009 | Lee et al. ....................... | 455/522 |
| 2011/0085485 A1 | 4/2011 | Yoon et al. | |

FOREIGN PATENT DOCUMENTS

| | | |
|---|---|---|
| CN | 101494482 A | 7/2009 |
| WO | 02/065663 A2 | 8/2002 |
| WO | 2011/160596 A1 | 12/2011 |

OTHER PUBLICATIONS

Chinese Office Action mailed on Jun. 25, 2015 for Chinese Application No. 201310117105.0, filed on Apr. 7, 2013 (7 pages).

* cited by examiner

*Primary Examiner* — Sanh Phu
(74) *Attorney, Agent, or Firm* — Perkins Coie LLP

(57) ABSTRACT

Techniques, devices, and systems that include mechanisms for network assisted fast adjustment of open loop power control mechanism. monitoring reverse link channels include calculating, based on results of the monitoring, an initial power adjustment value for controlling power of a wireless device in communication with the network and broadcasting the initial power adjustment value over a forward link control channel at least as often as a paging channel transmission cycle over the forward link control channel.

16 Claims, 9 Drawing Sheets

| Field | Length (bits) |
|---|---|
| CONFIG_MSG_SEQ | 6 |
| ACC_MSG_SEQ | 6 |
| ...... | |
| INIT_PWR_ADJ | 4 or 5 |

FIG. 10

| Field | Length (bits) |
|---|---|
| CONFIG_MSG_SEQ | 6 |
| ACC_MSG_SEQ | 6 |
| ...... | |
| INIT_PWR_ADJ | 5 |

FIG. 11

NETWORK ASSISTED FAST OPEN LOOP POWER CONTROL ADJUSTMENT

CROSS REFERENCE TO RELATED APPLICATIONS

This document claims the benefit of priority under 35 U.S.C. §119(a) and the Paris Convention of International Patent Application No. PCT/CN2012/073607, filed on Apr. 6, 2012. The entire content of the before-mentioned patent application is incorporated by reference herein.

BACKGROUND

This patent document relates to wireless communications in wireless communication systems and power control of wireless communication devices such as mobile devices with the wireless network.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry data such as voice data and other data content to wireless devices. A base stations can be referred to as an access point (AP), eNodeB or access network (AN) or can be included as part of an access network. Further, a wireless communication system can include one or more network nodes to control one or more base stations.

A wireless device can use one or more different wireless technologies for communication with the network. Various wireless technologies examples include Code division Multiple Access (CDMA) such as CDMA2000 1×, High Rate Packet Data (HRPD), and Long-Term Evolution (LTE), Worldwide Interoperability for Microwave Access (WiMAX), Wireless Local Area Network (WLAN). In some implementations, a wireless communication system can include multiple networks using different wireless technologies.

SUMMARY

This patent document discloses techniques for network assisted open loop power control of the power of a wireless device in communication with the wireless network.

In one example aspect, a method implemented at a network-side in a wireless communication network is disclosed. The method includes monitoring reverse link channels, calculating, based on results of the monitoring, an initial power adjustment value for controlling power of a wireless device in communication with the network, and broadcasting the initial power adjustment value over a forward link control channel at least as often as a paging channel transmission cycle over the forward link control channel.

In another example aspect, a wireless communication method is disclosed for implementation at a receive of wireless signals. An initial power adjustment value that is applicable to a first transmission rate is received. From the initial power adjustment value, an initial power setting for a second transmission rate that is different from the first transmission rate, is calculated. The second transmission rate may be, e.g., an integer multiple of the first transmission rate, or vice versa. A signal at the second transmission rate is transmitted at the initial power setting.

These, and other, aspects are further described below.

BRIEF DESCRIPTION OF THE DRAWINGS

FIG. 10 is an example of modifying General Paging Message to include INIT_PWR_ADJ.

FIG. 11 is another example of including INIT_PWR_ADJ in a new message.

Like reference symbols in the various drawings indicate like elements.

DETAILED DESCRIPTION

Figure 1:
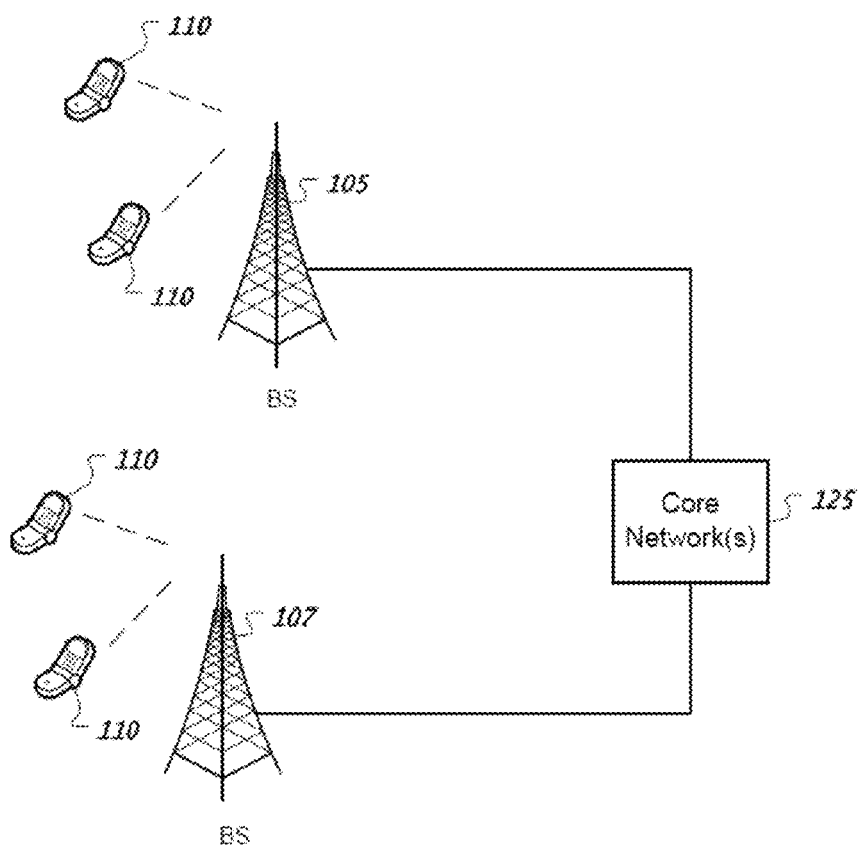
FIG. 1 is a block diagram illustrating a wireless communications network.

In wireless communications, the power control mechanism plays an important role because the performance of power control mechanism directly impacts the wireless system performance such as air link capacity, interference, link robustness, link quality, etc.

In certain implementations of wireless communication technologies, wireless devices in the idle state may rely on an open loop power control algorithm to estimate the initial transmit power level setting, where this open loop power control algorithm is based on the forward link pilot measurement by the wireless device. Since the forward link pilot measurement can be quite different from the accurate required transmit power level over the reverse link access channel, this power control may not be accurate for the reverse link access channel. In addition, various implementations of this open loop power control lack a way for a wireless device to choose a proper access transmission data rates over a multiple-rates access channel and this aspect can adversely affect the communication performance.

Various wireless communication systems can use a connection oriented mode for wireless transmissions. In such a connection oriented mode, a wireless device sets up a traffic channel with the wireless network before sending any user data. Once the connection is established, the dedicated radio resource is allocated for a particular traffic channel. The wireless device and wireless network then can use traffic channels to transmit packet data. The radio resource remains occupied until the connection is released even the wireless device or the network does not have data to send.

The connection oriented mode transmission has advantages for streaming transmission such as voice, video, data downloading or uploading. For the short burst data transmission, such as in various web browsing applications, short messages, instant messaging, e-mails, gaming, machine-tomachine (M2M) communications (e.g., vending machine, monitoring system, meter reading, environment sensing), the packet size is typically small and transmission is not constant and periodic. Hence, it is not efficient to transmit such burst data via connection oriented mode.

The connectionless mode data transmission mechanisms can provide instant data transmission without establishing a connection and reserving radio resource for the connection. Such connectionless mode data transmission mechanisms can provide an efficient way for burst data transmission without the transmission delay required in the connection oriented mode.

Wireless devices can transmit short burst data over the reverse link connectionless channel such as the reverse link access channel (R-ACH), or reverse link enhanced access channel (R-EACH) in cdma2000 technology.

Unlike the connection oriented transmission that the network can use a couple of power control mechanisms to control power of wireless devices, for example, closed loop power control and outer loop power control mechanisms, the connectionless transmission relies on the wireless devices to estimate the initial transmit power level settings at the wireless devices. If the initial transmit power level from a wireless device is set too high, the wireless device is over-powered and can cause significant interference to other active wireless devices, e.g., of other users. If the initial transmit power level of a wireless device is set too low, the wireless network may not be able to receive the access probe sent from that wireless device and thus may cause the wireless device to re-transmit more access probes with incremental transmit power before an access probe is acknowledged. This situation undesirably consumes more battery power of the wireless devices, adversely affecting the battery operating time of the wireless device which can be critical to power sensitive wireless devices, and create more interference.

In cdma2000 wireless technology, the wireless device uses an open loop power control mechanism to determine the initial transmit power setting. The open loop power control algorithm includes some parameters and the forward link pilot strength (SINR) measured by the wireless device as follows:

$$\text{mean output power (dBm)} = -\text{mean input power (dBm)} + \text{offset power} + \text{interference correction} + \text{NOM\_PWRs} - 16 \times \text{NOM\_PWR\_EXTs} + \text{INIT\_PWRs} + \text{PWR\_LVL} \times \text{PWR\_STEPs},$$

Where the "mean input power" is the received power measured in a given bandwidth, and the "interference correction" is the forward pilot signal. Both are measured by the wireless device. The other variables have their conventional meaning, e.g., as used in cdma2000 standard.

The following operational problems existing with the existing open loop power control algorithm, especially using for the connectionless transmission on power sensitive wireless devices:

A) The initial transmit power setting over a connectionless channel such as access channel or enhanced access channel may be far away from the accurate because the algorithm uses the forward link channel condition to estimate the reverse link channel condition. In most cases, the forward link and reverse link channel conditions (such as loading, interference from adjacent cells, path loss, etc.) are not same. Therefore, the estimate from the open loop power control is very inaccurate.

B) With this inaccurate initial transmit power estimate, the wireless device may transmit an access probe under-power or over-power. Consequently, it reduces the access channel capacity. In some cases, the access channel can only allow a few of wireless devices to transmit simultaneously.

C) When the initial transmit power estimated by the open loop power control algorithm is under-powered, it requires to re-transmit more times of access probes with transmit power increasing before the base station can be able to acquire the access probe. This retransmission delays the access, increases interference on the reverse link and consumes more batter power of the wireless device, especially for a power sensitive M2M device. If the initial transmit power level estimated by the open loop power control algorithm is over-powered, it will reduce the access channel capacity and increase the interference to current active users.

D) Some parameters in the open loop power control algorithm such as NOM_PWR, or INIT_PWR in Access Parameter Message (APM) in cdma2000 1× are pre-configured by the network and transmitted, e.g., every 1.28 seconds. It is not expected to change those parameters very frequently. It is difficult to rely on those parameter to fast reflect radio environment condition for the mobile device to adjust the initial transmit power setting.

E) Even if the network can change this parameter in every 1.28 seconds, it will cause the access delay of the wireless device since wireless devices have to receive this parameter before sending every access probe. In addition, frequently change of APM will impact the battery life of regular mobile stations since each APM change requires all the wireless devices to update the access parameter even they do not attempt to transmit access probes.

A new mechanism is disclosed for providing a more accurate open loop power control estimate via fast adjustment according to the reverse line measurement assisted by the network and solving the issues above.

FIG. 1 shows an example of a wireless communication system. A wireless communication system can include one or more base stations (BSs) 105a, 105b, one or more wireless devices 110a, 110b, 110c, 110d, and an access network 125. A base station 105a, 105b can provide wireless service to wireless devices 110a, 110b, 110c and 110d in one or more wireless sectors. In some implementations, a base station 105a, 105b includes directional antennas to produce two or more directional beams to provide wireless coverage in different sectors.

The access network 125 can communicate with one or more base stations 105a, 105b. In some implementations, the access network 125 includes one or more base stations 105a, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110a, 110b, 110c and 110d. A first base station 105a may provide wireless service based on a first radio access technology, whereas a second base station 105b may provide wireless service based on a first radio access technology and/or a second radio access technology. The base stations 105a and 105b may be co-located or may be separately installed in the field according to the deployment scenario. The access network 125 may support single radio access technology or multiple different radio access technologies.

Various examples of wireless communication systems and access networks that can implement the present techniques and systems include, among others, wireless communication systems based Code division Multiple Access (CDMA) such as cdma2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Worldwide Interoperability for Microwave Access (WiMAX) and Wireless Local Area Network.

Figure 2:
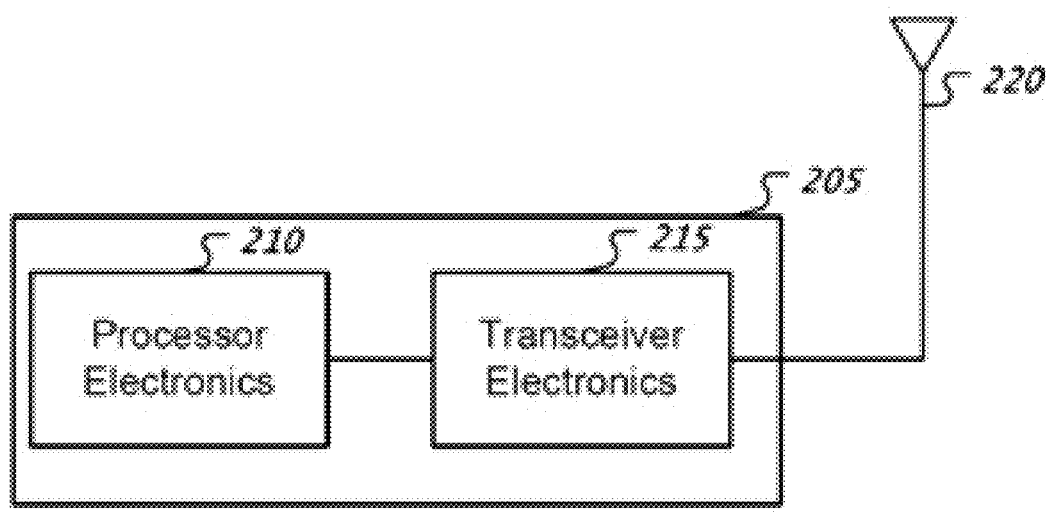
FIG. 2 is a block diagram representation of a wireless communications device.

FIG. 2 shows a radio station 205 such as a base station or a wireless device (e.g., user equipment UE) that can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215. It will be appreciated that the disclosed techniques may be implemented to execute on the radio station 205.

The mechanism of network assisted fast adjustment of open loop power control consists of algorithms on both networks and devices:

A) A wireless network measures the reverse link channel condition and calculates the adjustment for the open loop power control periodically.

B) A wireless network periodically broadcast the adjustment for the open loop power control in a more frequent manner such as once in every 80 ms paging channel cycle so that wireless devices can be able to receive it instantly when attempting to start an access probe transmission. This reduces the access transmission delay and helps to improve battery life of wireless devices.

C) A wireless device checks the adjustment of open loop power control transmitted from the wireless network ONLY when the wireless device is to transmit an access probe, and then compensates the initial transmit power with the received adjustment in the open loop power control calculation, and uses the corrected power level setting to transmit an access probe to the wireless network. In this way, there is no impact on battery life of wireless devices caused by frequently updating the adjustment parameter in the broadcast overhead message.

D) A wireless device can derive different adjustment values for different access transmission data rates from the received base open loop power control adjustment value, and determine initial transmit power for each transmission data rate. Depending on the transmission rate determination algorithm, a wireless device can choose proper data rate with correct initial transmit power for the initial access probe transmission.

Figure 3:
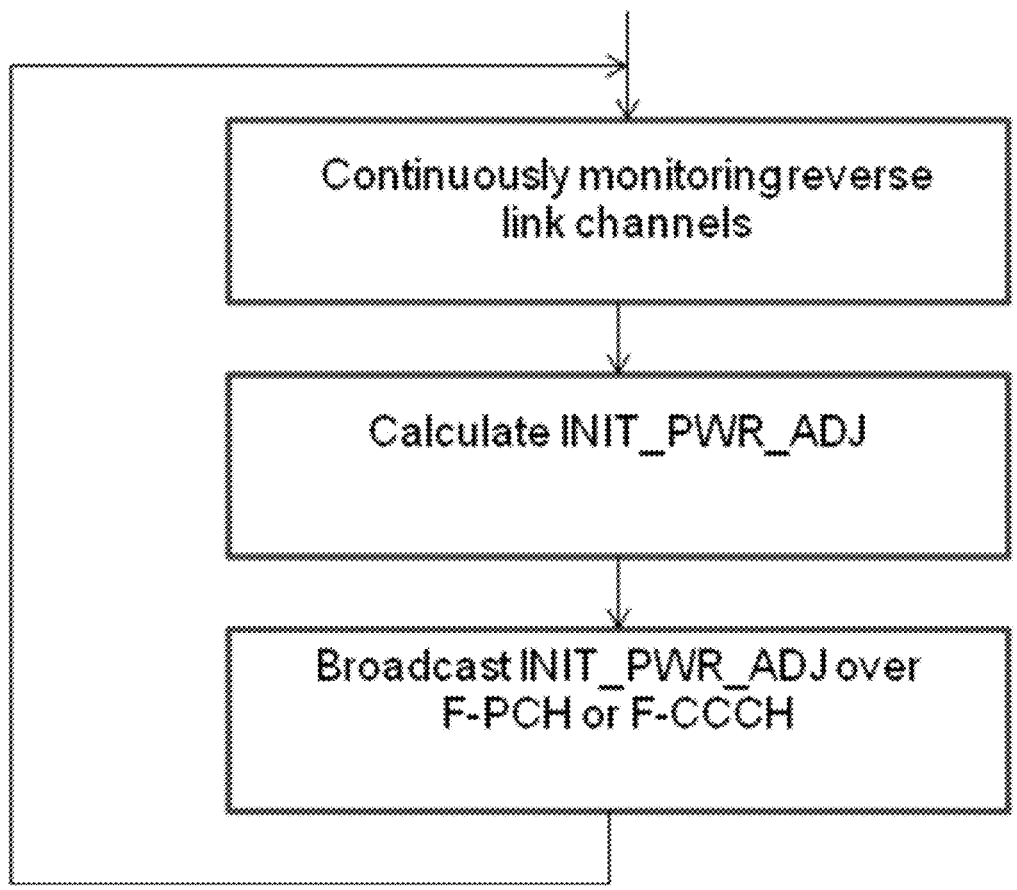
FIG. 3 is an example of network procedure of the network assisted fast adjustment for the open loop power control algorithm.

FIG. 3 shows an example of network procedure of the network assisted fast adjustment for the open loop power control algorithm. The wireless network is continuously monitoring the reverse link channel conditions. It calculates the adjustment (INIT_PWR_ADJ) of the initial transmit power setting in the open loop power control according to the reverse link channel condition, required energy for decoding signal at a given modulation scheme, and number of transmitted access probes, etc. Then the wireless network broadcasts the INIT_PWR_ADJ over the forward link paging channel or common control channel in a frequent manner such as in every 80 ms. The wireless network repeats this procedure of fast adjustment of open loop power control persistently to provide the instant correct level of initial transmit power setting for wireless devices.

Figure 4:
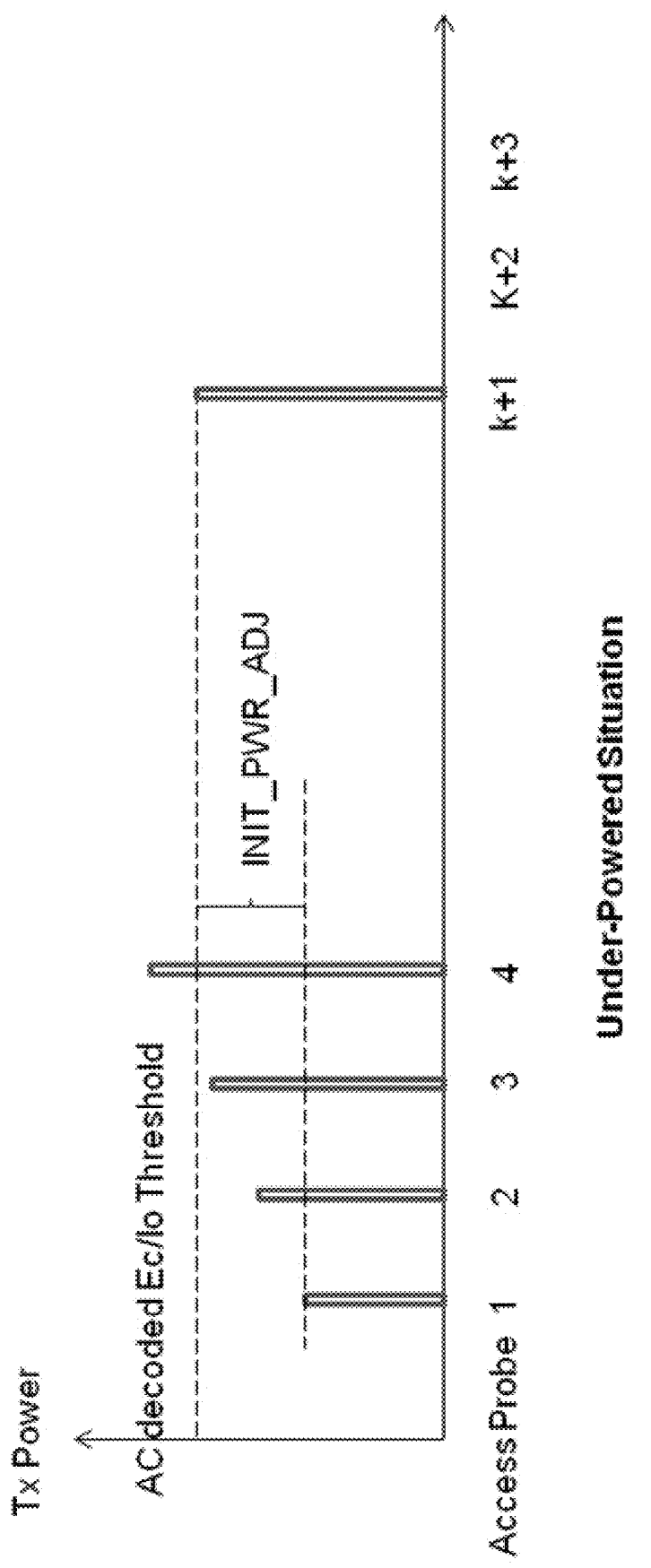
FIG. 4 is an example of the algorithm of network assisted fast adjustment for open loop power control in the underpowered transmission case.

FIG. 4 shows an example of the algorithm of network assisted fast adjustment for open loop power control in the under-powered transmission case. The wireless device starts an access probe with the initial power setting that may be based on current open loop power control algorithm. Since the current open loop power control estimate is inaccurate and causes the wireless device to retransmit four times of access probes before the wireless network can be able to detect and decode it. After the wireless network acquires the access probe, it calculates the required energy Ec for decoding the access probe according to Nt (total interference and noise on the reverse link), and derives the initial power adjustment (INIT_PWR_ADJ) from the number of access probes. Then the network broadcasts the averaging initial transmit power adjustment INIT_PWR_ADJ over the forward link channel such as paging channel or common control channel in the next paging cycle and periodically update the adjustment that indicates power boosting for the initial access probe transmission.

When a wireless device attempts to send an access probe at k+1, it checks the latest INIT_PWR_ADJ value, use it to compensate its initial transmit power setting in the open loop power control mechanism and transmit an access probe with corrected initial power level so that the wireless network can detect and decode within a few (e.g., four or less) access probe transmission.

Figure 5:
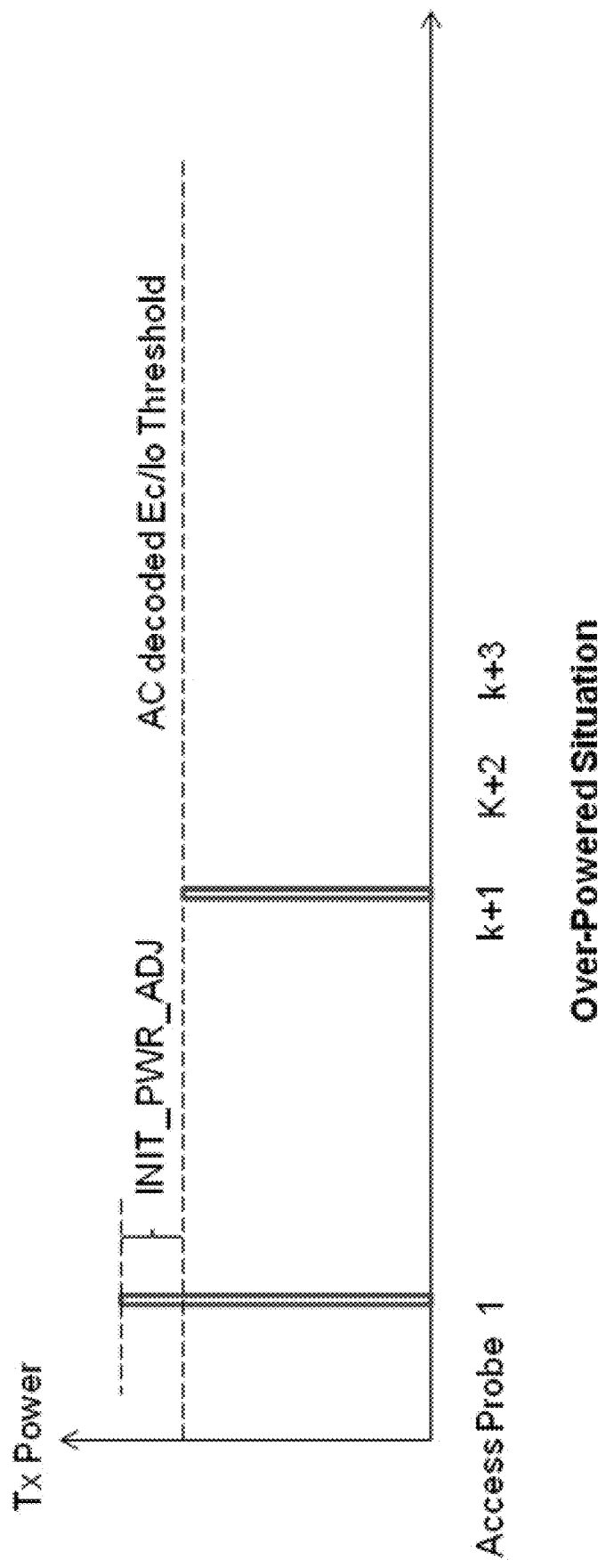
FIG. 5 is an example of the algorithm of network assisted fast adjustment for open loop power control in the overpowered transmission case.

FIG. 5 shows an example of the algorithm of network assisted fast adjustment for open loop power control in the over-powered transmission case which may occur when the access network is under loaded or less inference from other cells. The wireless network continues monitoring reverse link and detects an access probe in the first transmission from the wireless device is over-powered. It then calculate the over-power level and broadcasts the INIT_PWR_ADJ over the forward link channel such as paging or common control channel to correct this setting in the open loop power control.

When a wireless device attempts to transmit an access probe at k+1, it checks the latest INIT_PWR_ADJ value, use it to compensate its initial transmit power setting in the open loop power control mechanism and transmits an access probe with corrected initial power level, i.e. backoff the transmission power for under loaded air link condition.

Figure 6:
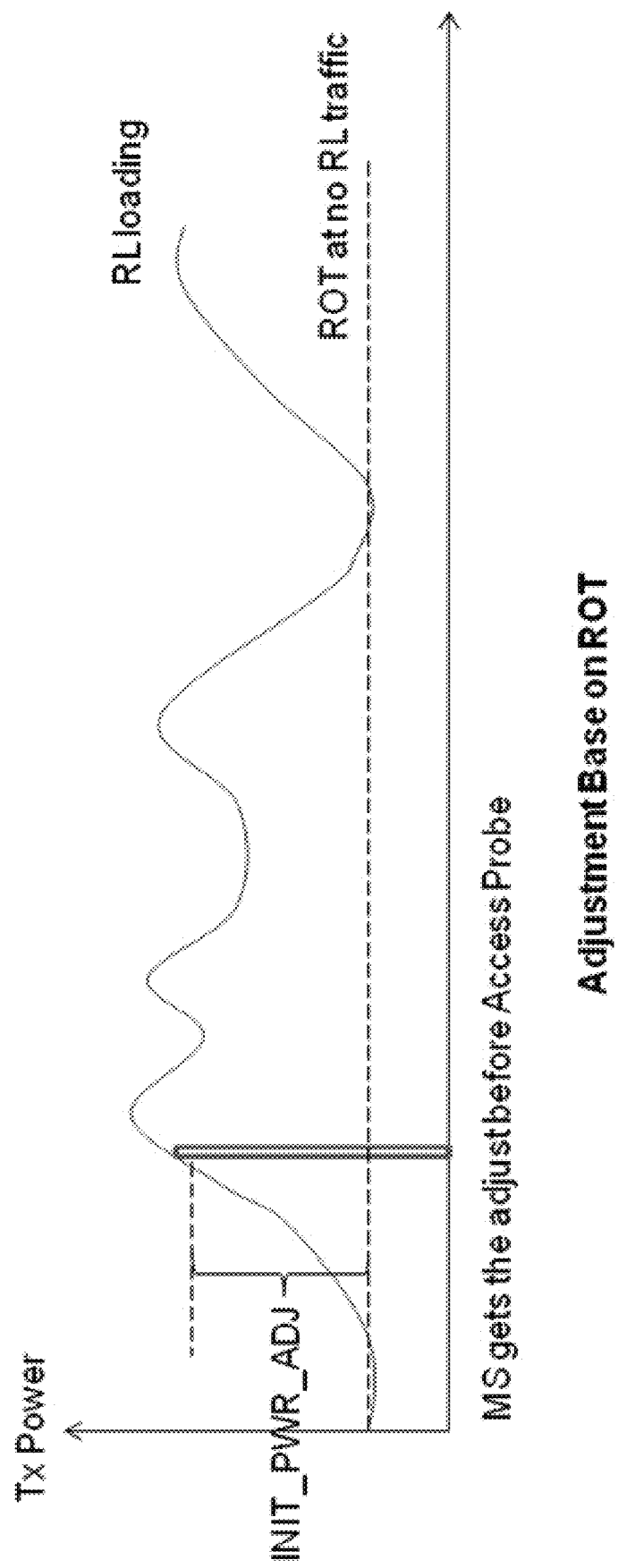
FIG. 6 is an example of the algorithm of network assisted fast adjustment for open loop power control based on reverse link channel condition.

FIG. 6 shows an example of the network assisted fast adjustment for the open loop power control algorithm based on the reverse link Rise of Thermal (ROT) measurement. The wireless network may measure the reverse link's ROT at the no reserve link traffic load period and use the result as the base ROT (ROTbase). It periodically monitors the reverse link channel condition (ROT) in the normal operation and calculates the initial transmit power adjustment as follows.

$$INIT\_PWR\_ADJ=(ROT-ROTbase) \times K(r).$$

Where $K(r)$ is the factor for a given data rate and modulation scheme (r). In wireless communication such as CDMA, Eb/No is used to express the required SINR for a bit, and Ec/Nt is used to express the received SINR for a chip.

$$Eb/No = Gp \times Ec/Nt$$

Where Gp is the processing gain.

In order for the base station to be able to decode an access probe in the base band, the received Eb/No should reach a certain level. Different data rate and modulation scheme may require different Eb/No. But once the modulation scheme and data rate is given, the required Eb/No is typically a constant, which is determined by the receiver's implementation. Therefore INIT_PWR_ADJ calculated by the base station is designated for a particular modulation scheme and data rate. For example, the INIT_PWR_ADJ is designated for the modulation scheme with data rate 4.8 kbps of R-ACH as the base open loop power control adjustment. The values of initial transmit power adjustment for other modulation schemes and data rates used in R-EACH such as 9.6 kbps, 19.2 kbps, 38.4 kbps or 76.8 kpbs can be derived from the base adjustment INIT_PWR_ADJ.

In some embodiments, the wireless network periodically and frequently broadcasts INIT_PWR_ADJ over the forward link paging or common control channel to provide instant correct initial transmit power setting for the open loop power control algorithm based on reverse link ROT measurement.

When a wireless device attempts to start an access probe process, it checks the latest INIT_PWR_ADJ value, use it to compensate its initial transmit power setting in the open loop power control and transmits an access probe with corrected initial power level.

The network is continuously correcting the required transmit power and broadcasts to wireless devices frequently. Therefore the wireless devices can get the latest adjustment value for the open loop power control instantly when they need to start the access probe process.

Figure 7:
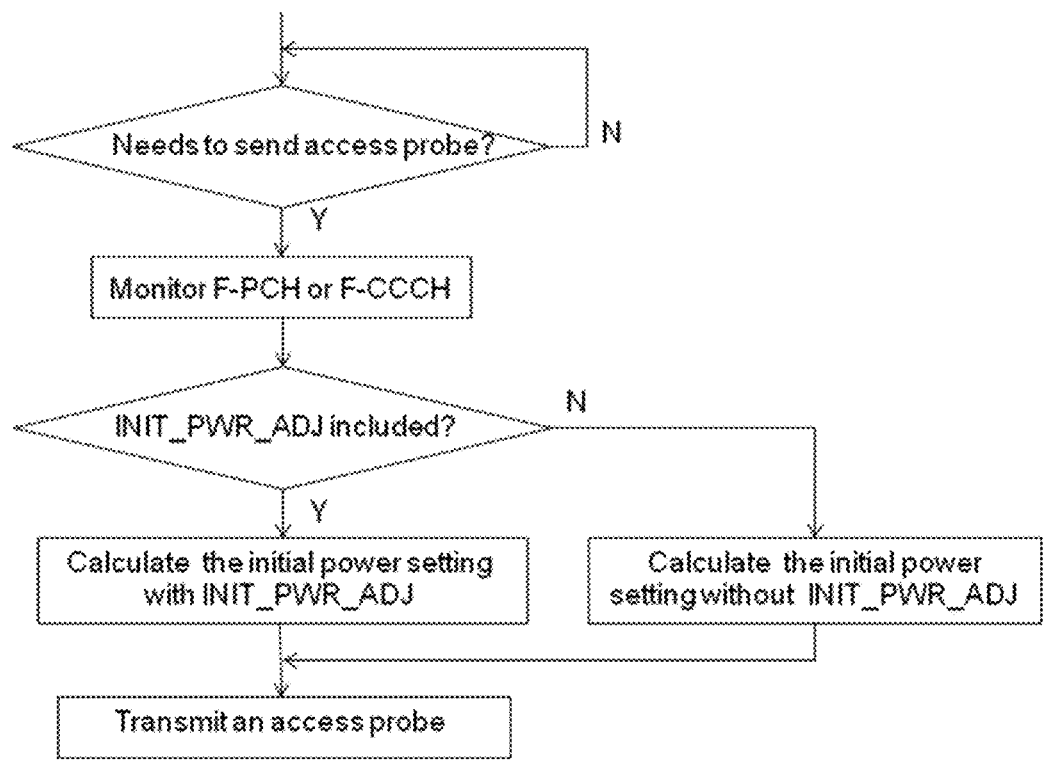
FIG. 7 is a flow chart illustrating wireless device procedure of the network assisted fast adjustment for the open loop power control algorithm.

FIG. 7 illustrates an example of wireless device procedure of the network assisted fast adjustment for the open loop power control algorithm.

If a wireless device in idle state does not need to transmit an access probe, it does not need to check the fast adjustment value INIT_PWR_ADJ for the open loop power control over the forward link overhead channel such as F-PCH, or F-CCCH. It avoids to impact on battery life of wireless devices due to frequently updating INIT_PWR_ADJ.

When a wireless device in idle state attempts to transmit an access probe, it first monitors the forward link overhead channel such as F-PCH, or F-CCCH to see if the INIT_PWR_ADJ is included in the overhead message such as General Paging Message (GPM), Fast Open Loop Adjustment Message (FOLAM), or other message. If the INIT_PWR_ADJ is not included, the wireless device uses the current open loop power control algorithm to calculate the initial transmit power setting for the access probe transmission. Otherwise, it includes INIT_PWR_ADJ in the initial transmit power setting of the open loop power control method as follows.

mean output power (dBm) =

−mean input power (dBm) + offset power + interference correction +

NOM_PWRs − 16 × NOM_PWR_EXTs + INIT_PWRs +

PWR_LVL × PWR_STEPs + INIT_PWR_ADjs × $K(r)$

Where $K(r)$ is the factor for a given data rate and modulation scheme (r).

The INIT_PWR_ADJ is not only used to adjust the initial transmit power for the open loop power control, but also used to determine the transmit data rate over R-EACH. The base adjustment INIT_PWR_ADJ reflects the reverse link channel condition on a given data rate and modulation scheme. If INIT_PWR_ADJ is high, that means the reverse link channel condition is bad and requires more initial transmit power of an access probe.

Figure 8:
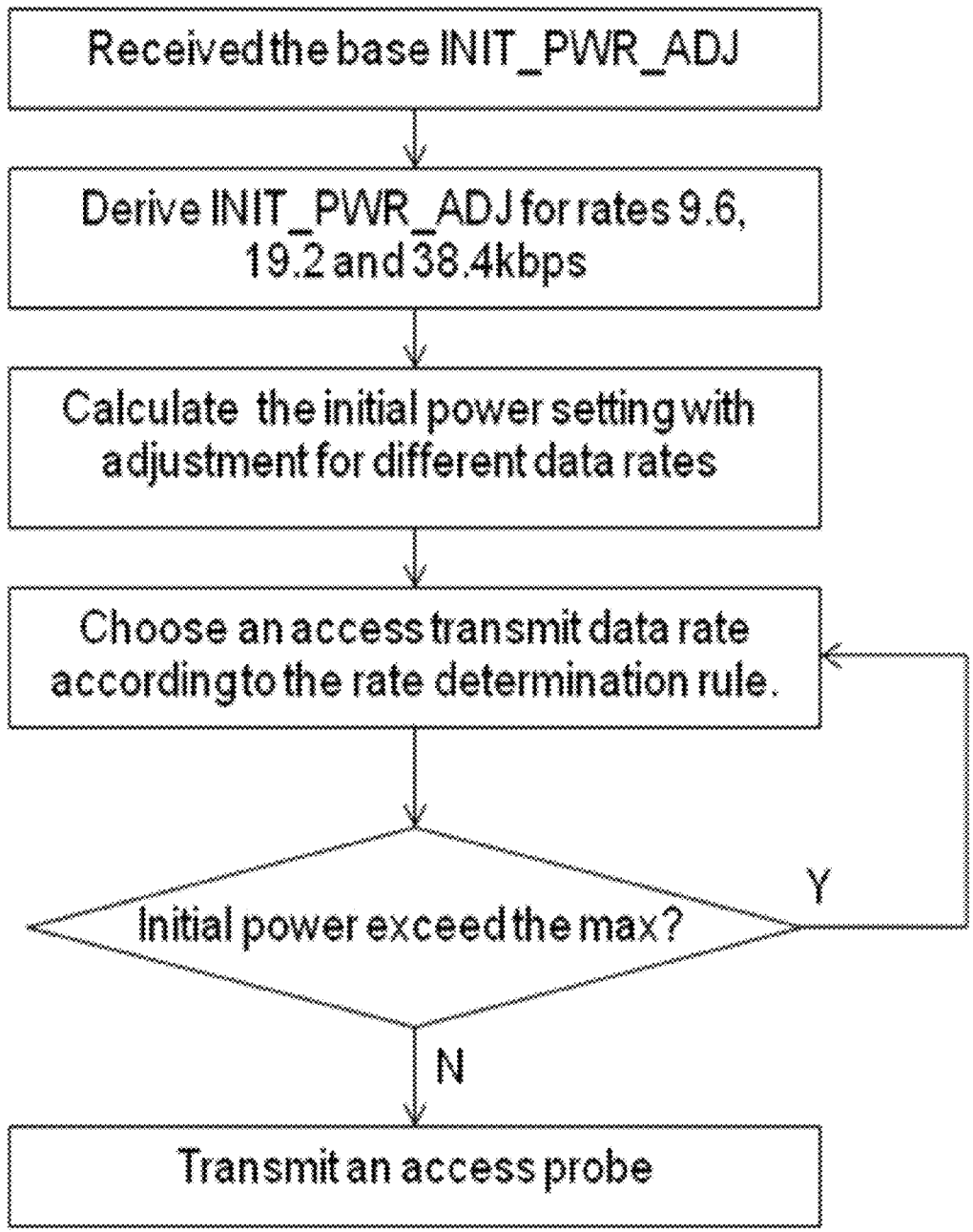
FIG. 8 is a flow chart illustrating a wireless device choosing a different transmission data rate with a proper initial transmit power setting.

FIG. 8 shows a diagram of wireless device choosing different transmission data rate over R-EACH with the proper initial transmit power adjustment. The wireless device may choose different data rates such as 9.6 kbps, 19.2 kbps or 38.4 kbps for transmitting an access probe over R-EACH. From the base INIT_PWR_ADJ that may be based on the data rate of 4.8 kbps, the wireless device can derive the INIT_PWR_ADJ$_{9.6}$ for data rate of 9.6 kbps, INIT_PWR_ADJ$_{19.2}$ for the data rate of 19.2 kbps and INIT_PWR_ADJ$_{38.4}$ for the data rate of 38.4 kbps; and calculate the mean input power using above algorithm for each data rate. If the transmit data rate determination algorithm of the wireless device prefers using higher data rate whenever possible, for example, the wireless device may choose the data rate of 38.4 kbps for the initial access probe transmission when the mean output power on the data rate of 38.4 kbps does not reach or exceed the maximum transmit power of the wireless device. Otherwise, the wireless device may consider to lower the transmit data rate until the required the mean input power for that data rate does not exceed the maximum transmit power of the wireless device.

Figure 9:
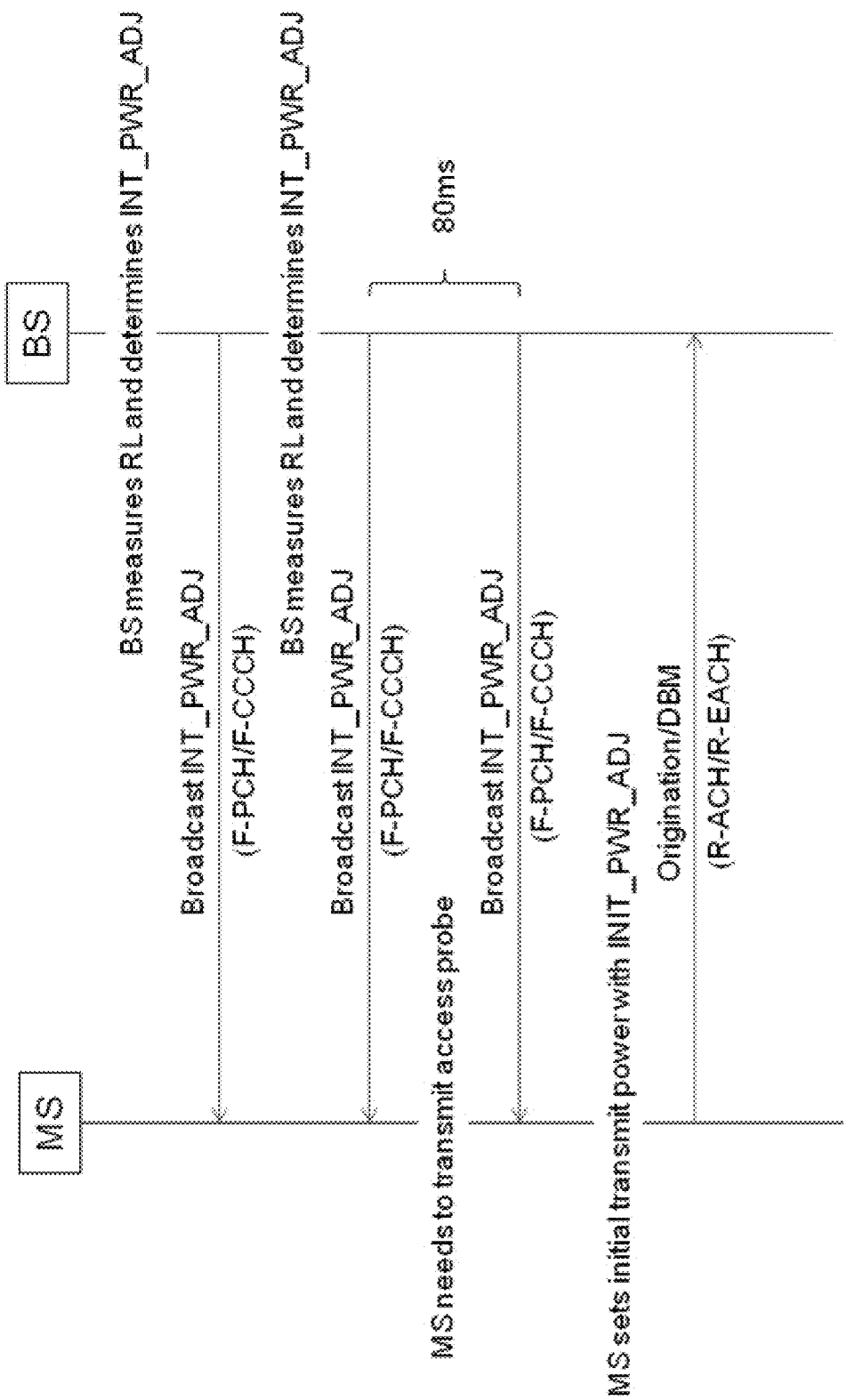
FIG. 9 is an example of wireless network and wireless device communication using the connectionless transmission with the network assisted fast adjustment of open loop power control algorithm.

FIG. 9 shows an example of wireless network and wireless device communication with the network assisted fast adjustment of open loop power control algorithm.

The wireless network (base stations) periodically updates INIT_PWR_ADJ according to the reverse link channel condition, number of used steps in access probe sequence and other conditions, and broadcast to wireless devices. When a wireless device is going to start a connectionless transmission over R-ACH or R-EACH, it monitors the forward link overhead channel such as F-PCH or F-CCCH to see whether INIT_PWR_ADJ is included or not. If the INIT_PWR_ADJ is received, the wireless device uses INIT_PWR_ADJ in the open loop power control algorithm to adjust the initial transmit power and choose a proper data rate for the access probe.

FIG. 10 shows an example of modifying existing General Paging Message to include INIT_PWR_ADJ value. The base station sets this field to the correction factor to be used by mobile stations in the open loop power estimate for the initial transmission on an Access Channel or Enhanced Access Channel, expressed as a non-negative integer value in units of 0.5 dB (0 to +7.5 dB), or a two's complement value in units of 0.5 dB (−8 to +7.5 dB), as an example.

FIG. 11 shows another example of the new message Fast Open Loop Adjustment Message (FOLAM) including INIT_PWR_ADJ value transmitted from the base station.

The disclosed and other embodiments, modules and the functional operations described in this document (e.g., a link monitor, an initial power adjustment calculator, a broadcaster, an access probe receiver, an estimator, a sequence number calculator, a transmitter, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method implemented at a network-side in a wireless communications network, comprising:
   monitoring reverse link channels;
   calculating, based on results of the monitoring, an initial power adjustment value for controlling power of a wireless device in communication with the network, wherein the calculating operation comprises:
      receiving, by a communication interface comprising an antenna, an access probe from a user equipment; and
      estimating the initial power adjustment based on a power level of the access probe, wherein the estimating operation includes using an access probe transmission sequence number for calculating the initial power adjustment; and
   broadcasting the initial power adjustment value over a forward link control channel at least as often as a paging channel transmission cycle over the forward link control channel.

2. The method of claim 1, wherein the broadcasting operation comprises:
   transmitting the initial power control value over at least one of a forward paging channel (F-PCH) and a Forward Common Control Channel (F-CCCH).

3. An apparatus operable in a wireless communications network, comprising:
   a link monitor that monitors reverse link channels;
   an initial power adjustment calculator that calculates an initial power adjustment value based on results of the monitoring, wherein the initial power adjustment calculator comprises:
      an access probe receiver that receives an access probe from a user equipment; and
      an estimator that estimates the initial power adjustment based on a power level of the access probe, wherein the estimator further includes a sequence number calculator that uses an access probe transmission sequence number for calculating the initial power adjustment; and
   a broadcaster that broadcasts the initial power adjustment value over a forward link control channel at least as often as a paging channel transmission cycle over the forward link control channel.

4. The apparatus of claim 3, wherein the broadcaster includes:
   a transmitter that transmits the initial power control value over at least one of a forward paging channel (F-PCH) and a Forward Common Control Channel (F-CCCH).

5. A computer program product comprising a non-transitory computer-readable medium having code stored thereon, the code, when executed by a processor, causing the processor to implement a method implemented at a network-side in a wireless communications network, comprising:
   monitoring reverse link channels;
   calculating an initial power adjustment value based on results of the monitoring, wherein the calculating operation comprises:
      receiving an access probe from a user equipment; and
      estimating the initial power adjustment based on a power level of the access probe, wherein the estimating operating further includes using an access probe transmission sequence number for calculating the initial power adjustment; and broadcasting the initial power adjustment value over a forward link control channel at least as often as a paging channel transmission cycle over the forward link control channel.

6. The computer program product comprising the non-transitory computer-readable medium of claim 5, wherein the broadcasting operation comprises:

transmitting the initial power control value over at least one of a forward paging channel (F-PCH) and a Forward Common Control Channel (F-CCCH).

7. An apparatus operable at a network-side in a wireless communications network, comprising:

means for monitoring reverse link channels;

means for calculating an initial power adjustment value based on results of the monitoring, wherein the means for calculating further comprises:

means for receiving an access probe from a user equipment; and means for estimating the initial power adjustment based on a power level of the access probe, wherein the means for estimating includes using an access probe transmission sequence number for calculating the initial power adjustment; and means for broadcasting the initial power adjustment value over a forward link control channel at least as often as a paging channel transmission over the forward link control channel.

8. A wireless communications method, comprising:

receiving an initial power adjustment value that is applicable to a first transmission rate;

calculating, from the initial power adjustment value an initial power setting for a second transmission rate that is different from the first transmission rate; and transmitting a signal at the second transmission rate using the initial power setting.

9. The method recited in claim 8, wherein the calculating operation comprises scaling the initial power adjustment value by a scalar based on the second transmission rate.

10. The method of claim 1, wherein the user equipment is a machine-to-machine (M2M) client device.

11. The method of claim 1, wherein the estimating the initial power adjustment includes calculating a required energy for decoding signals at a modulation scheme.

12. The method of claim 1, wherein the estimating the initial power adjustment includes calculating a number of transmitted access probes.

13. The apparatus of claim 3, wherein the estimating the initial power adjustment includes calculating a required energy for decoding signals at a modulation scheme.

14. The apparatus of claim 3, wherein the estimating the initial power adjustment includes calculating a number of transmitted access probes.

15. The computer program product of claim 5, wherein the estimating the initial power adjustment includes calculating a required energy for decoding signals at a modulation scheme.

16. The computer program product of claim 5, wherein the estimating the initial power adjustment includes calculating a number of transmitted access probes.

\* \* \* \* \*